Nov. 10, 1936. W. G. VIALL ET AL Re. 20,169

SHAVING INSTRUMENT

Original Filed Jan. 24, 1934

INVENTORS
WILLIAM G. VIALL
HARRY A. RANKOW
BY
ATTORNEY

Reissued Nov. 10, 1936

Re. 20,169

UNITED STATES PATENT OFFICE 20,169

SHAVING INSTRUMENT

William G. Viall, Bloomfield, N. J., and
Harry A. Rankow, Bronx, N. Y.

Original No. 2,038,557, dated April 7, 1936, Serial No. 708,016, January 24, 1934. Application for reissue June 25, 1936, Serial No. 87,318

6 Claims. (Cl. 30—43)

The present invention relates to shaving instruments and more specifically to devices which obviate the necessity of employing hair softeners or the like.

An important feature of the invention resides in the provision of a shaving instrument formed with a handle and having a hollow shell provided with a series of tapered blades and a reciprocating cutter having teeth adapted to contact the inner faces of the blades.

Another object of the invention is in the provision of means to at all times retain intimate yet slidable engagement between the stationary blades of the shell and the reciprocating teeth of the cutter.

A further object is to provide a shaving instrument having a handle portion provided with resilient means to removably retain a shaving head.

Further features are the particular prong means to effect removable union between the handle and shaving head; the resiliently mounted ball means in the shell to afford frictionless pressure against the reciprocating cutter; the novel reciprocating means to provide a greater period of time for the hair to assume a position between the cutter teeth; and a self supporting, open ended shell for ruggedness and easy cleaning.

These and other objects of the invention and the means for their attainment will be more apparent from the following detailed description, taken in connection with the accompanying drawing, illustrating one embodiment by which the invention may be realized, and in which.

Figure 5:
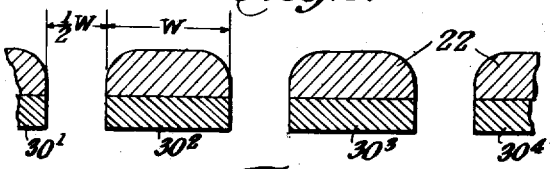
Figure 6:
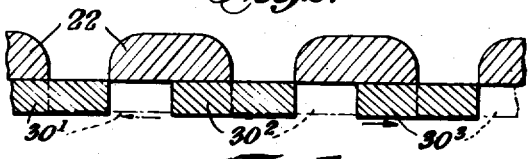
Figure 7:
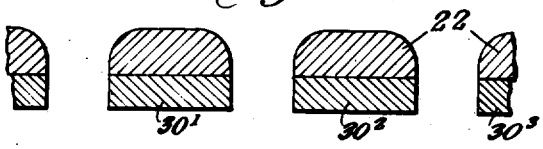
Figure 8:
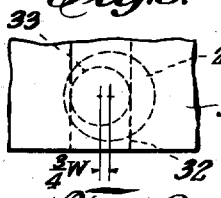
Figure 9:
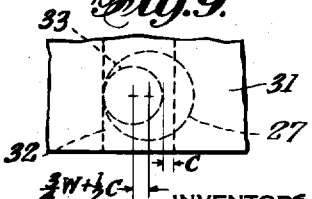

Figs. 5, 6, and 7 show various positions of the cutter teeth in relation to the shell blades, and Figs. 8 and 9 show, in plan, preferred forms of eccentric and slot means for reciprocating the cutter.

In the present disclosure, the instrument comprises a handle 10 of suitable size and form to be conveniently grasped in one hand. It is preferably formed of two halves secured together as at 11 and may be designed to house a motor (not shown) to drive the shaft 12. The shaft 12, may of course, be driven by a flexible shaft from a motor remotely placed or in any other desirable manner.

The handle is formed with a seat 13 which may be curved as shown and is preferably provided with sockets 14 opening in the seat. Transverse spring members 15 pass from side to side of the handle and intercept the periphery of the sockets 14. Recesses 16 communicate with the sockets and surround the portions of the spring members which lie within the sockets.

Figure 1:
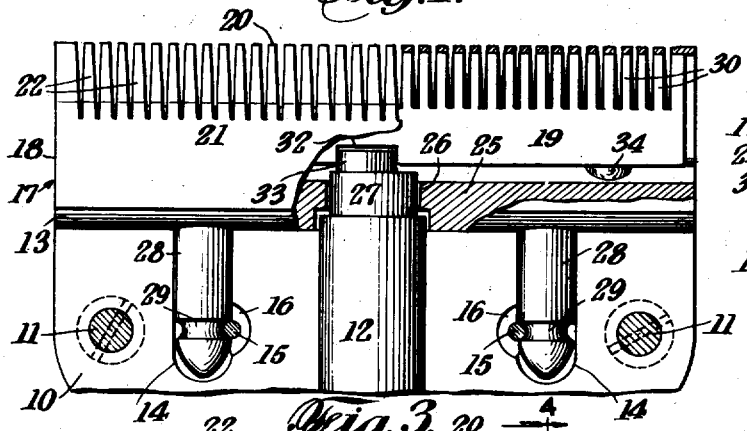
Fig. 1 is a partial side elevational and partial sectional view of a preferred embodiment of the invention, the handle being broken away.
Figure 2:
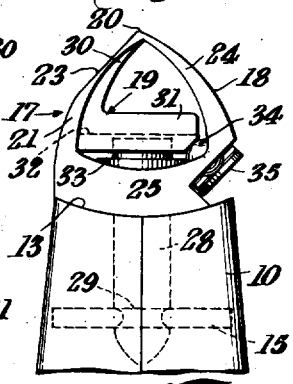
Fig. 2 is an end elevational view thereof.
Figure 3:
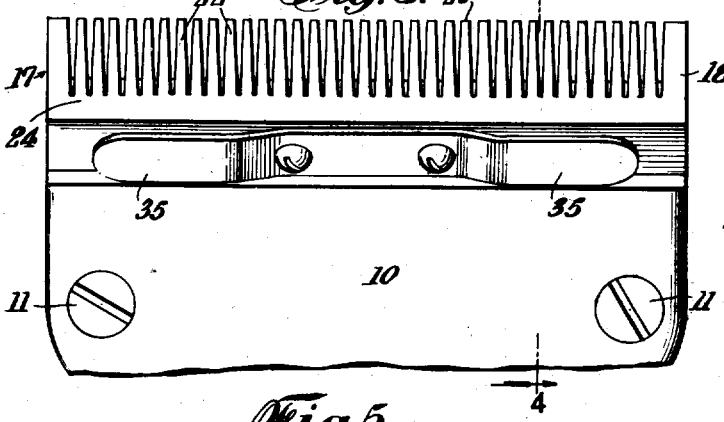
Fig. 3 is a side elevational view as seen from the right of Fig. 2.
Figure 4:
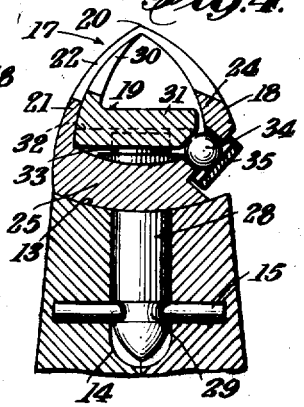
Fig. 4 is a vertical sectional view as taken along the line 4—4 of Fig. 3.

The shaving head 17 comprises essentially a shell 18 and a cutter 19. The shell is preferably formed as an elongated, hollow, triangularly shaped, hardened steel member, the sides of which are preferably convexly bowed, joining in an apex as at 20. One side 21 is slotted to provide a series of equally spaced tapered blades 22 and as shown in Fig. 2, these blades may be formed with their outer surfaces flattened as at 23. As clearly shown in Fig. 2 the outer and inner surfaces of side 21 of the shell, in the region of the blades, closely approximate tangency. The other side 24 of the shell may also be slotted in a manner quite similar to that of the side 21.

The base leg 25 of the shell may preferably be somewhat thicker than the other legs which are preferably increasingly thickened from the apex downward. As can readily be seen, a sturdy, self-supporting shell having well supported shear blades 22 is in this manner provided.

The base leg 25 of the shell 18 is apertured at 26 to admit the upper reduced portion 27 of the drive shaft 12 and a pair of spaced prongs 28, each provided with a circumferential groove 29 engageable by the springs 15 when entered into the sockets 14, is fixed to project from the base leg of the shell.

The cutter 19 is preferably L-shaped and one leg is formed with a series of spaced teeth 30 having parallel sides and it is preferred that these teeth be increasingly thicker as they approach the horizontal leg 31 of the cutter. This leg is preferably straight both longitudinally and transversely and is provided on its under face with a slot 32 engageable by an eccentric 33 on the drive shaft.

To insure intimate contact between the cutter teeth 30 and the shear blades 22, the shell is provided with means to afford resilient pressure against the cutter. In the present form this comprises a pair of balls 34 urged against the cutter by a leaf spring 35.

Since the inner faces of the shear blades 22 and the outer faces of the cutter teeth 30 preferably have the same curvature, and since the leg 31 of the cutter and the base leg 25 of the shell are spaced from each other, there is no other contact between the cutter and shell except between the cutting blades and the shear teeth. The leaf spring 35 being designed to transmit, through the balls 34, a proper compression against the cutter, the cutter is thus mounted to be easily and smoothly reciprocated within the hollow of the shell.

As previously stated, it is preferred that the shear blades 21 be tapered and the cutter blades 30, rectangular, so that upon reciprocation of the cutter a slicing action is obtained therebetween.

The hair cutting is afforded at or near the thinnest part of the shell and at this point it is preferred that the shear blades be proportioned in the following manner: With special reference to Fig. 5, the shear blades 22 are made of a width "W" and the spaces therebetween "½W". For the sake of clarity in description, the cutter teeth in this figure are indicated at $30^1$, $30^2$, $30^3$, and $30^4$. It has been determined that the best cutting results are obtained when one of the cutter teeth is moved from an aligned position with one of the shear blades to an aligned position with either adjacent shear blade; Figs. 5 and 7 illustrate these two extreme positions of the cutter teeth. To accomplish this the amount of eccentricity of the eccentric 32 is equal to "¾W" as shown in Fig. 8.

Fig. 6 illustrates the position of the cutter teeth at the instant of shearing when moving in one direction and the broken lines indicate the cutter teeth in the shearing position, when moving in the other direction.

The reciprocating movement of the cutter, being imparted by an eccentric, the cutter moves fastest during the shearing operation and slowest when in substantial alignment with the shear blades. This is desirable so as to afford sufficient time for the hair to assume a position between the cutter blades.

When the rotation of the shaft 12 is relatively slow (about 2000 R. P. M.), an eccentric as shown in Fig. 8 will afford sufficient time for the hair to assume a cutting position, but when the shaft is relatively fast (about 3400 R. P. M.) there is not sufficient time for the hair to assume a proper cutting position and in this instance, the slot 32 of the cutter is widened to an amount equal to "C" and the eccentricity of the eccentric made to equal ¾W+½C. Now there will be two periods of momentary rest of the cutter when its teeth are aligned with the shear blades. The above is desirable, due to the difficulty in constructing a slow speed motor capable of being housed within the handle 10.

It is now readily apparent that a shaving instrument has been provided which, for the purpose intended, is a considerable improvement over existing devices. It is understood that the features herein described may be modified in many instances and changes in construction may be made by those skilled in the art without departing from the general broad scope of the invention.

What is claimed, is:

1. A shaving instrument comprising an elongated, hollow, polygonal shell having shear blades in one wall thereof, at least one of the walls of said shell being convexly bowed, and two of said walls being increasingly thickened from their common apex to afford rigidity to the shell, a cutter having teeth reciprocally movable within the shell, said shear blades and cutter teeth having a shearing engagement, a handle, and means to removably secure the shell in the handle.

2. A shaving instrument comprising an elongated, hollow, polygonal shell having shear blades in one wall thereof, at least one of the walls of said shell being convexly bowed, and two of said walls being increasingly thickened from their common apex to afford rigidity to the shell, a cutter having teeth reciprocally movable within the shell, said shear blades and cutter teeth having a shearing engagement, said cutter being substantially L-shaped, a handle, and means to removably secure the shell in the handle.

3. A shaving instrument comprising a handle and an elongated, hollow, shell at an end thereof, said shell having transverse shear blades in a portion thereof, said shell in the region of the blades, having an arcuate inner surface, the inner and outer surfaces of said shell in said region, closely approximating tangency so that the wall of the shell, from the line of substantial tangency outward in opposite transverse directions is increasingly thickened to afford rigidity to the shell, a cutter reciprocally movable within the shell, said cutter having an upstanding portion carrying transversely curved teeth having shearing engagement with the shear blades, said cutter having a substantially horizontal base, and means extending lengthwise of the handle and approximately perpendicular to the plane of the base and connected directly therewith for reciprocating the cutter.

4. A shaving instrument comprising a handle and an elongated, hollow, one-piece integral shell at an end thereof, said shell having integral transverse shear blades in a portion thereof, said shell in the region of the blades, having an arcuate inner surface, the inner and outer surfaces of said shell in said region, closely approximating tangency so that the wall of the shell, from the line of substantial tangency outward in opposite transverse directions is increasingly thickened to afford rigidity to the shell, a cutter reciprocally movable within the shell, said cutter having an upstanding portion carrying transversely curved teeth having shearing engagement with the shear blades, said cutter having a substantially horizontal base; yieldably mounted anti-friction bearing means carried by the instrument and bearing against the cutter in a direction approximately at right angles to a line tangent to the curve of the shear blades, and means extending lengthwise of the handle and approximately perpendicular to the plane of the base and connected directly therewith for reciprocating said cutter.

5. A shaving instrument comprising a handle and an elongated hollow one-piece integral shell at an end thereof, said shell having integral transverse shear blades in the outer portion thereof, said outer portion being convexly bowed and said convexly bowed portion being increasingly thickened in opposite transverse directions from an intermediate point to afford rigidity to the shell, and a cutter having an upstanding portion carrying transversely curved teeth having shearing engagement with the shear blades, said cutter having a substantially horizontal base, means cooperating with said base for guiding the movement thereof in a straight line, and means extending lengthwise of the handle and approximately perpendicular to the plane of the base and connected directly therewith for reciprocating said cutter.

6. A shaving instrument comprising a handle and an elongated hollow shell having a base portion extending transversely of and secured directly to an end of the handle, said shell having transverse shear blades in a portion thereof, a cutter reciprocally movable within the shell and having an approximately horizontal base arranged in close proximity with and extending along the base portion of the shell and having an upstanding portion carrying transversely curved teeth having shearing engagement with the shear blades, said base of the cutter being in position to be disposed in an approximately horizontal position when the handle is in an upright position with the shell at the upper end thereof, and means extending lengthwise of the handle and approximately perpendicular to the plane of the base and connected therewith for reciprocating said cutter.

WILLIAM G. VIALL.
HARRY A. RANKOW.